United States Patent
Evans

[11] Patent Number: 5,730,258
[45] Date of Patent: Mar. 24, 1998

[54] BUSHING ASSEMBLY FOR A CALIPER DISK BRAKE

[76] Inventor: Michael D. Evans, 6728 Walnut Dr., Gates Mills, Ohio 44040

[21] Appl. No.: 684,571

[22] Filed: Jul. 19, 1996

[51] Int. Cl.$^6$ ................................................ F16D 65/14
[52] U.S. Cl. ........................... 188/73.44; 188/71.1
[58] Field of Search .................. 188/71.1, 71.8, 188/73.41, 73.42, 73.43, 73.44, 73.45, 370; 277/212 FB; 384/903; 267/293, 141.2

[56] References Cited

U.S. PATENT DOCUMENTS

| 2,328,877 | 9/1943 | Gallagher | 267/293 |
| 4,228,726 | 10/1980 | Rinker et al. | 188/71.8 X |

FOREIGN PATENT DOCUMENTS

| 2061673 | 6/1978 | Germany | 188/73.43 |
| 1930685 | 11/1979 | Germany | 188/73.45 |
| 2142395 | 1/1985 | United Kingdom | 188/73.45 |

OTHER PUBLICATIONS

Feb. 1992 General Motors Service Parts Operations—Chevrolet—18J Manual; pp. 4–64.

Primary Examiner—Robert J. Oberleitner
Assistant Examiner—Pamela J. Lipka
Attorney, Agent, or Firm—Renner, Kenner, Greive, Bobak, Taylor & Weber

[57] ABSTRACT

A bushing assembly (30) for a caliper disk brake includes a pair of bushings (32) opposingly disposed on a common centerline (34) in a caliper brake bolt bore (56). Each bushing (32) has a cylindrical body section (40) and a flange (50) extending from the body section (40). The body section (40) has a plurality of ribs (52) extending radially inward from the inner surface (54) of the body section (40) and a circumferential groove (60) in the outer surface (62) of the body section (40). The groove (60) is configured to seat a retainer ring (36) that prevents the bushing (32) from being ejected from the bolt bore (56) in which the bushings (32) are installed. The bushing assembly (30) prevents the caliper arm (16) from binding to the caliper bolts (18) when corrosion builds around the caliper bolt (18) by providing a space (72) between the second ends (44) of the bushings (32).

9 Claims, 4 Drawing Sheets

5,730,258

1
BUSHING ASSEMBLY FOR A CALIPER DISK BRAKE

TECHNICAL FIELD

The present invention relates to a bushing assembly for a caliper disk brake. More particularly, the present invention relates to a bushing assembly for a caliper disk brake that prevents the binding of the caliper arm to the caliper bolts which can be caused by corrosion between the caliper arm and the bushing assembly.

BACKGROUND OF THE INVENTION

A typical caliper disk brake assembly includes a caliper arm that is attached by a pair of caliper bolts to a plate that extends from a wheel of the vehicle. A pair of brake pads are carried by the caliper arm on either side of a rotor that is also attached to the wheel of the vehicle. A piston-cylinder is disposed between one of the brake pads and the caliper arm such that movement of the piston urges both brake pads against the rotor to create friction that slows the rotating wheel.

The caliper disk brake assembly is designed to evenly distribute the force of the piston between both brake pads and thus both sides of the rotor. The force is evenly distributed because the caliper arm, the brake pads, and the piston-cylinder are slidingly carried by the caliper bolts. Thus, when the piston is moved, one end of the piston-cylinder pushes directly against the inner brake pad while the other end of the piston-cylinder pushes against the inner portion of the caliper arm. The force of the piston causes the caliper arm to slide along the caliper bolts and pull the outer brake pad against the outer surface of the rotor. Thus, it can be understood that the force created by the piston-cylinder is evenly distributed to both sides of the rotor.

In known calipers, a one-piece bushing is disposed between each caliper bolt and the caliper arm. The bushing functions to absorb vibration from the caliper arm and to protect the bolts from the caliper arm. One problem with the one-piece bushings is that their configuration does not prevent moisture from entering the space between the bushing and the caliper arm. Such moisture leads to the buildup of corrosion between the bushing and the caliper arm. Over time, the corrosion builds to a degree that it pushes against the bushing and the caliper arm, and eventually builds to a point where the bushing is pushed against the caliper bolts to such an extent that a binding force is created between the caliper arm and the caliper bolts. When the force between the caliper arm and the caliper bolts is greater than the force created by the piston-cylinder, the caliper arm is prevented from sliding along the caliper bolts. As such, all of the force created by the piston-cylinder acts on the inner brake pad and thus the inner surface of the rotor. When the caliper arm is bound to the caliper bolts by the force of the corrosion, the expected life of inner brake pad is significantly shortened. Furthermore, the consumer is required to replace the rotor more frequently because of the wear to the inner surface of the rotor.

A further disadvantage with the existing design is that different bushings are required for each caliper bolt because most brake assemblies have caliper bolts of different lengths. The requirement of different bushings for each caliper bolt increases the expense of manufacturing the brake assembly. Thus, the need exists for a bushing for a caliper disk brake that may be used with caliper bolts of various lengths and that will prevent the undesirable binding effects of corrosion.

SUMMARY OF THE INVENTION

It is, therefore, a primary object of the present invention to provide a bushing assembly for a caliper disk brake that prevents corrosion from binding the caliper arm to the caliper bolts.

2

It is another object of the present invention to provide a bushing assembly, as above, that may be used with caliper bolts of varying lengths.

It is a further object of the present invention to provide a bushing assembly, as above, that includes a retainer ring that prevents the bushing from being ejected from the bolt bores in the caliper arm and prevents moisture from entering the caliper bolt bore.

It is yet another object of the present invention to provide a bushing assembly, as above, that may be installed in existing caliper disk brake assemblies without requiring modification of the assemblies.

These and other objects of the invention, as well as the advantages thereof over existing and prior art forms, which will be apparent in view of the following detailed specification, are accomplished by the improvements hereinafter described and claimed.

In general, a bushing assembly embodying the concepts of the present invention is adapted for use with a caliper arm of a caliper disk brake having at least one bolt bore. The bushing assembly includes a first bushing having a generally cylindrical body section which has a first end and a second end. A second bushing has a generally cylindrical body section which also has a first end and a second end. The first and second bushings are opposingly aligned along a common centerline in the bolt bore such that a space exists between said second ends of the body sections.

To acquaint persons skilled in the arts most closely related to the present invention, one preferred embodiment of a bushing assembly that illustrates a best mode now contemplated for putting the invention into practice is described herein by, and with reference to, the annexed drawings that form a part of the specification. The exemplary bushing assembly is described in detail without attempting to show all of the various forms and modifications in which the invention might be embodied. As such, the embodiment shown and described herein is illustrative, and as will become apparent to those skilled in these arts, can be modified in numerous ways within the spirit and scope of the invention; the invention being measured by the appended claims and not by the details of the specification.

PREFERRED EMBODIMENT FOR CARRYING OUT THE INVENTION

Figure 1:
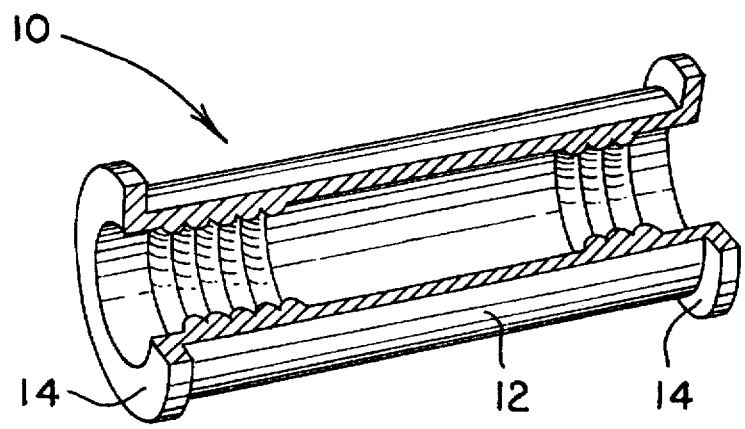
FIG. 1 is a sectioned perspective view of a one-piece prior art bushing.
Figure 2:
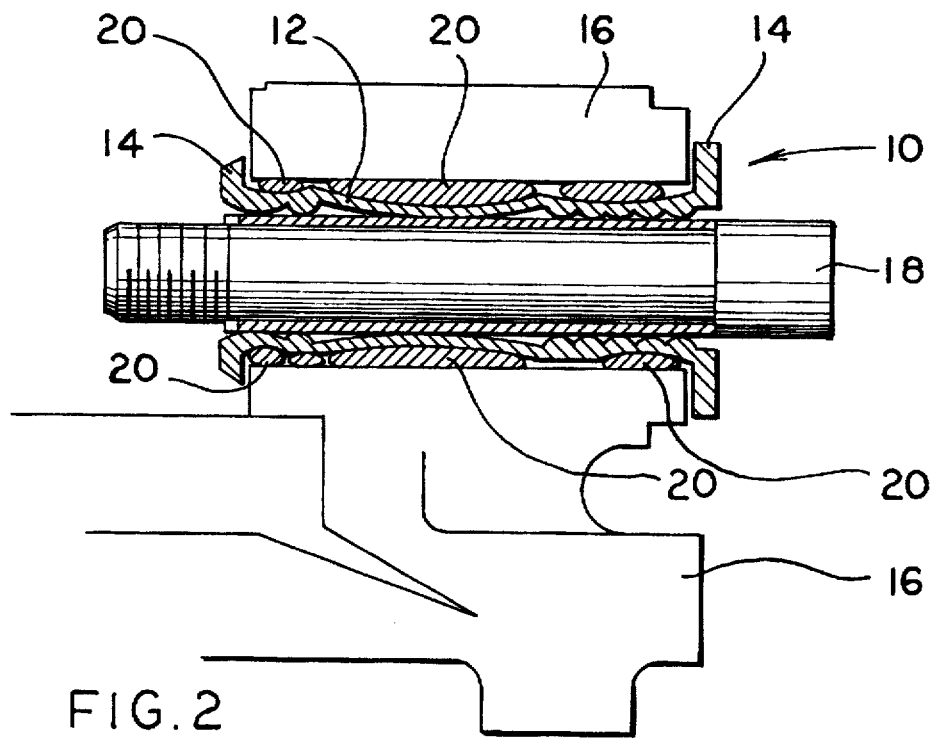
FIG. 2 is a sectional side view of a one-piece prior art bushing shown with a typical caliper arm and caliper arm bolt.
Figure 3:
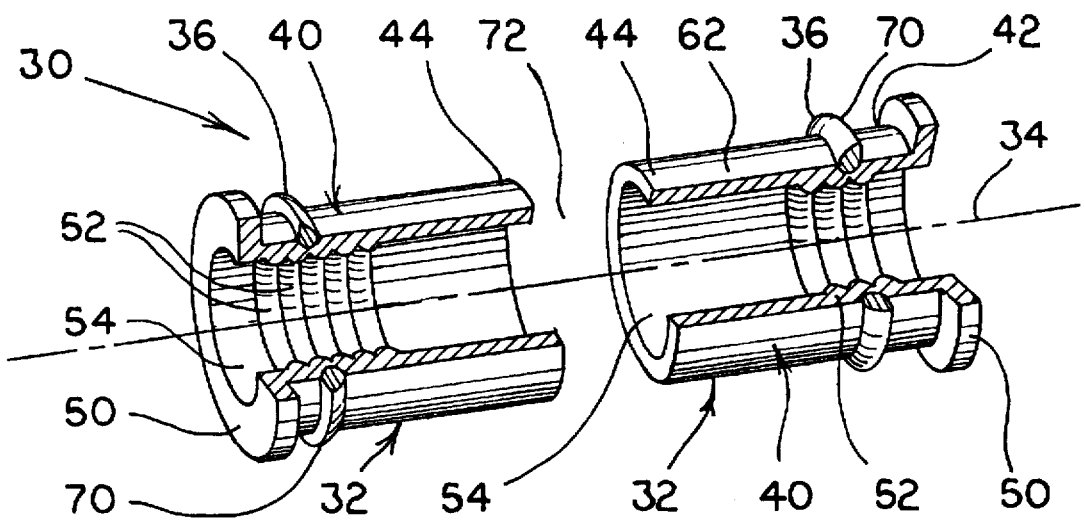
FIG. 3 is a sectioned perspective view of a bushing assembly made in accordance with the concepts of the present invention.
Figure 4:
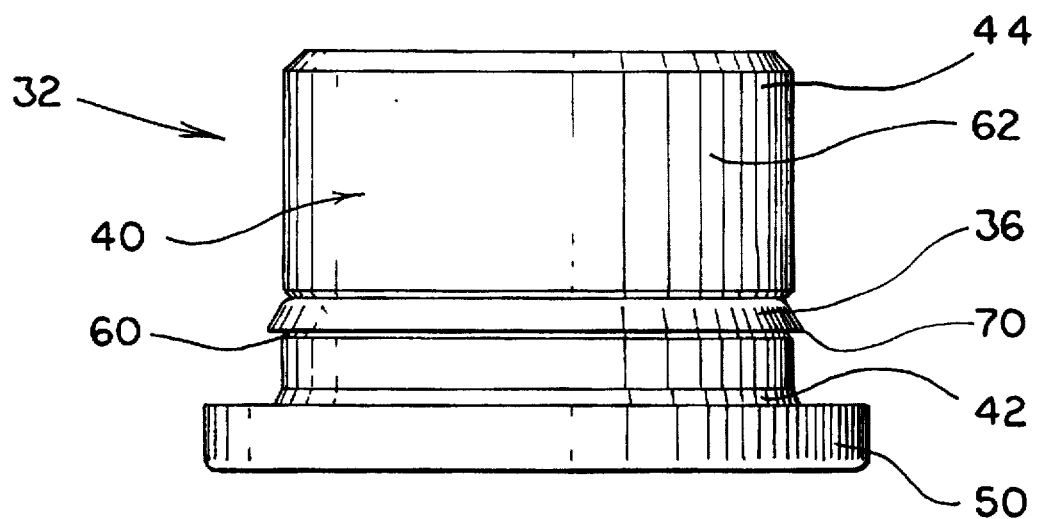
FIG. 4 is an elevational view of one of the bushings of a bushing assembly made in accordance with the concepts of the present invention.

In order to better understand the improvements of the present invention and the problems inherent in the prior art bushings, a typical prior art one-piece bushing is depicted in FIGS. 1 and 2 and is indicated generally by the numeral 10. One-piece bushing 10 includes an elongate cylindrical body 12 having a flange 14 extending radially outward from each end thereof. Each flange 14 functions to maintain the position of bushing 10 with respect to a caliper arm 16 when caliper arm 16 slides on a caliper bolt 18.

The effect of the formation of a corrosion pocket is depicted in FIG. 2. Eventually, pockets of corrosion or scale 20 typically build up between caliper arm 16 and bushing 10. The pockets of corrosion or scale 20 force body 12 of bushing 10 radially inward until it contacts caliper bolt 18. Over time, the force between caliper arm 16 and caliper bolt 18 created by corrosion pocket 20 becomes larger than the force created by the piston-cylinder (not shown) and caliper arm 16 is prevented from sliding along caliper bolt 18. When this occurs, the braking force created by the piston-cylinder is solely directed to the inner brake pad and the inner surface of the rotor.

A bushing assembly made in accordance with the concepts of the present invention is generally indicated by the numeral 30. Bushing assembly 30 includes a pair of substantially identical bushings 32 when, when assembled, are opposingly disposed along a common centerline 34. Bushing assembly 30 further includes a retainer ring 36 positioned around each bushing 32. Preferably, each bushing 32 is fabricated from synthetic elastomer of the ethylene propylene family suitable for exposure from −40 degrees to +350 degrees Fahrenheit and compounded to resist deterioration on exposure to brake fluid.

Figure 6:
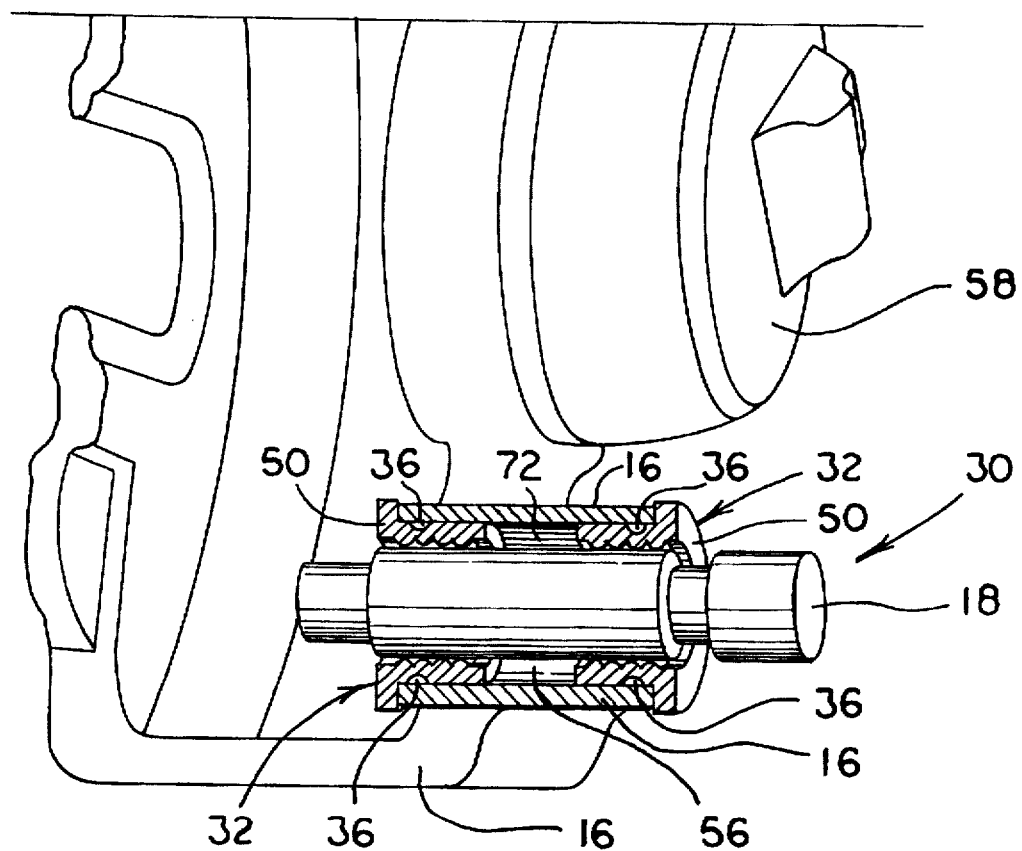
FIG. 6 is a sectioned perspective view of a bushing assembly made in accordance with the concepts of the present invention and installed in a caliper arm with a caliper bolt passing therethrough.

Each bushing 32 includes a generally cylindrical body 40 having a first end 42 and a second end 44. A generally disk-shaped flange 50 extends radially outward from first end 42 and may be integrally formed with cylindrical body 40. A plurality of ribs 52 extend radially inward from at least a portion of the inner surface 54 of cylindrical body 40. When bushing 32 is installed in the bolt bore 56 of a caliper arm 16, flange 50 abuts caliper arm 16 and limits the axial movement of bushing 32 with respect to caliper arm 16 in one direction. Also when installed, ribs 52 contact caliper bolt 18 as may be seen in FIG. 6. Although ribs 52 contact bolt 18, the friction therebetween is not large enough to prevent bushing 32 from sliding along bolt 18 with caliper arm 16 when the piston-cylinder 58 is extended forcing the brake pads (not shown) into the rotor (also not shown). A lubricant such as grease is typically applied to bolt 18 and inner surface 54 to facilitate such movement.

Figure 5:
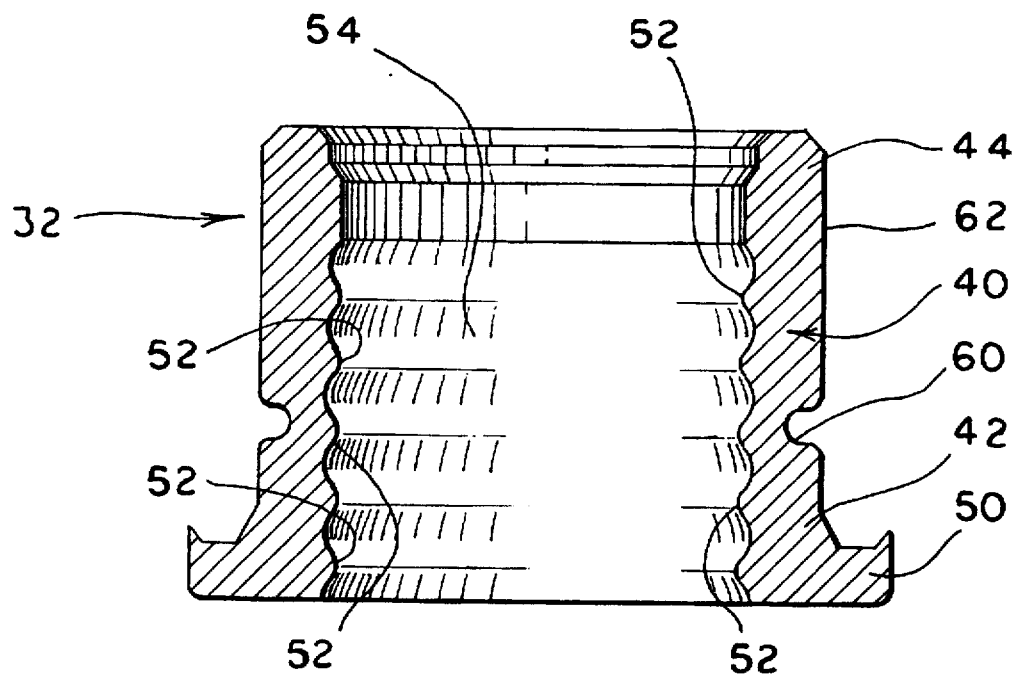
FIG. 5 is a vertical sectional view of the bushing of FIG. 4.

As may be perhaps best seen in FIG. 5, a circumferential groove 60 is formed in the outer surface 62 of each bushing 32 adjacent first end 42. Groove 60 provides a seat for retainer ring 36 and thereby prevents retainer ring 36 from moving axially with respect to cylindrical body 40 when bushing 32 is installed in bolt bore 56 of caliper arm 16. Once installed, retainer ring 36 maintains the position of bushing 32 with respect to caliper arm 16 and it also functions to prevent moisture from entering the space between caliper arm 16 and bushing 32.

Figure 7:
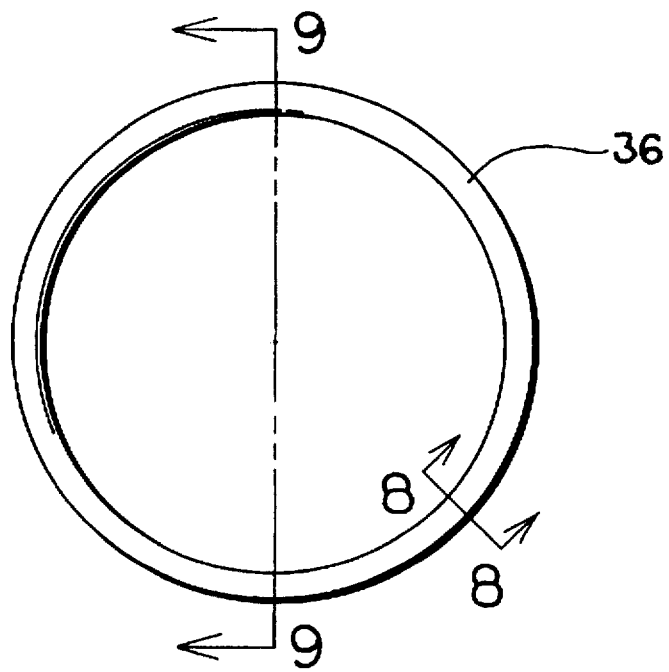
FIG. 7 is a top view of a retainer ring used with the bushing assembly of the present invention.
Figure 8:
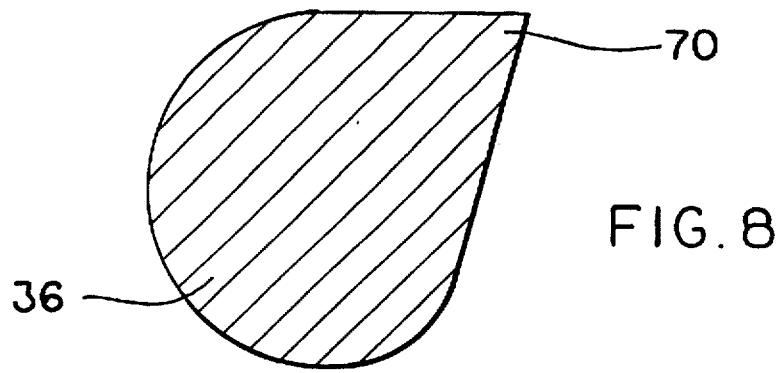
FIG. 8 is a sectional view taken substantially along line 8—8 in FIG. 7.
Figure 9:
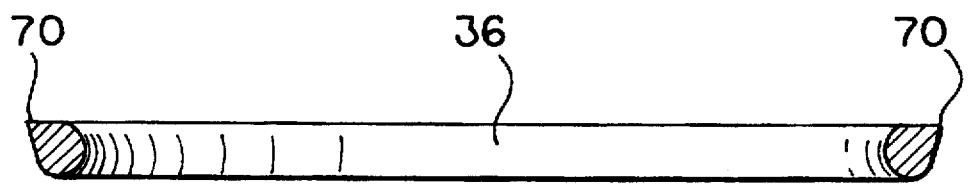
FIG. 9 is a sectional view taken substantially along line 9—9 in FIG. 7.

One configuration of retainer ring 36 is depicted in FIGS. 7–9. As may be seen in FIG. 7, retainer ring 36 is substantially circular such that contact is maintained between ring 36 and bolt bore 56 when bushing 32 having retainer ring 36 is installed. As may be seen in FIGS. 8 and 9, the cross section of retainer ring 36 is tapered such that when it is installed around bushing 32, a tail 70 of retainer ring 36 extends radially outwardly and toward flange 50. Thus, when bushing 32 is inserted into bolt bore 56, tail 70 contacts bore 56 and functions to increase the friction between retainer ring 36 and bolt bore 56. Other configurations of retainer ring 36 which perform the same function are also contemplated by the present invention.

Bushing assembly 30 is installed in a typical caliper disk brake by inserting one bushing 32 having retainer ring 36 into each end of bolt bore 56 in caliper arm 16. Each bolt bore 56 has a predetermined axial length. When both bushings 32 are inserted, a space 72 is formed between second ends 44 of bushings 32 because the combined length of both bushings 32 is substantially less than the predetermined axial length of bore 56.

Caliper bolt 18 is then inserted through both bushings 32 and caliper arm 16 and can then be screwed into a support structure (not shown). When bushing assembly 30 is installed in a caliper disk brake assembly according to the concepts of the present invention, the problem of corrosion build-up experienced by the one-piece prior art bushing does not readily occur. First, retainer ring 36 prevents a substantial amount of corrosion-causing moisture from entering bore 56. Thus, any corrosion build-up which might occur results over a longer period of time than in the prior art. Second, even if a corrosion pocket forms, the corrosion pocket cannot bind caliper arm 16 to caliper bolt 18 because the corrosion pocket forms in space 72 and does not push bushings 32 against bolt 18. Furthermore, because of space 72 a single bushing 32 configuration may be used with bolts 18 of different length because the length of bushing 32 is not dependant on the length of bolt 18. When bushings 32 are used with bolts 18 of varying lengths, the size of space 72 varies to accommodate the differences in the length of bolts 18.

While only a preferred embodiment of the present invention is disclosed, it is to be clearly understood that it is susceptible to numerous changes apparent to one skilled in the art. Therefore, the scope of the present invention is not to be limited to the details shown and described but is intended to include all changes and modifications which come within the scope of the appended claims.

I claim:

1. In combination with a caliper disk brake having a caliper arm and a bolt substantially constant diameter bolt bore of a predetermined axial length, a bushing assembly comprising a pair of bushings positioned in said bolt bore, each of said bushings having an axial length, and a radial wall thickness, the combined lengths of each of said bushings being less than the length of the bolt bore, and a caliper bolt disposed through said bushings and the bolt bore such that a space is formed between said bolt and the caliper arm, said space having a radical thickness substantially equal said radical wall thickness of said bushings.

2. The combination of claim 1, further comprising a retainer ring surrounding each of said bushings.

3. The combination of claim 2, wherein each of said retainer rings has a tail extending radially outward from said bushing to engage said bolt bore.

4. The combination of claim 2 wherein each of said bushings has a circumferential groove therein for seating said retainer ring.

5. The combination of claim 1, wherein each of said bushings has a generally cylindrical body section having a first end and a second end.

6. The combination of claim 5, further comprising a generally disk-shaped flange extending radially outwardly from said first end of each of said body sections.

7. The combination of claim 5, wherein each of said body sections has an inner surface and a plurality of ribs extending radially inward from said inner surface.

8. A bushing assembly adapted for use with a caliper arm of a caliper disk brake having at least one substantially constant diameter bolt bore, said bushing assembly comprising a first bushing having a generally cylindrical body section, said body section of said first bushing having a first end and a second end, a second bushing having a generally cylindrical body section; said body section of said second bushing having a first end and a second end, said first and second bushings being opposingly alignable along a common centerline in the bolt bore such that a space exists between said second ends of said body sections, each of said body sections having a circumferential groove disposed therein, and a retainer ring seated in each of said circumferential grooves, each of said retainer rings having a tail extending therefrom, said tails being adapted to engage the bolt bore.

9. A bushing assembly according to claim 8, wherein each of said body sections has an inner surface and a plurality of ribs extending radially inward from said inner surface.

* * * * *

UNITED STATES PATENT AND TRADEMARK OFFICE
CERTIFICATE OF CORRECTION

PATENT NO. : 5,730,258

DATED : March 24, 1998

INVENTOR(S) : Michael D. Evans

It is certified that error appears in the above-identified patent and that said Letters Patent is hereby corrected as shown below:

Column 4, line 44, remove the first occurrence of the word "bolt"

Column 4, line 47, remove the "," after the word "length"

Column 4, line 52, the word "radical" should read --radial--.

Signed and Sealed this

Second Day of February, 1999

*Attest:*

*Attesting Officer*

*Acting Commissioner of Patents and Trademarks*